(12) United States Patent
Sakamaki et al.

(10) Patent No.: US 7,207,573 B2
(45) Date of Patent: Apr. 24, 2007

(54) CHUCK ASSEMBLY

(75) Inventors: Kazuo Sakamaki, Ojiya (JP); Akira Sakamaki, Ojiya (JP); Chokichi Sato, Ojiya (JP)

(73) Assignee: Yukiwa Seiko Kabushiki Kaisha, Niigata (JP)

( * ) Notice: Subject to any disclaimer, the term of this patent is extended or adjusted under 35 U.S.C. 154(b) by 0 days.

(21) Appl. No.: 10/727,531

(22) Filed: Dec. 5, 2003

(65) Prior Publication Data

US 2004/0108662 A1    Jun. 10, 2004

(30) Foreign Application Priority Data

Dec. 6, 2002    (JP) .............................. 2002-355666

(51) Int. Cl.
B23B 31/12    (2006.01)

(52) U.S. Cl. ........................................ 279/62; 279/902

(58) Field of Classification Search ................ 279/60, 279/61, 62, 90, 902
See application file for complete search history.

(56) References Cited

U.S. PATENT DOCUMENTS

| | | | |
|---|---|---|---|
| 3,810,642 A | | 5/1974 | Derbyshire |
| 4,060,251 A | | 11/1977 | Amyot |
| 5,183,274 A | * | 2/1993 | Sakamaki ................. 279/62 |
| 5,465,983 A | * | 11/1995 | Owens et al. ............. 279/157 |
| 5,476,273 A | * | 12/1995 | Shadeck et al. ............ 279/60 |
| 5,499,828 A | * | 3/1996 | Salpaka et al. ............. 279/62 |
| 5,765,839 A | | 6/1998 | Röhm |
| 5,984,320 A | * | 11/1999 | Nakamura ................. 279/62 |
| 6,010,135 A | * | 1/2000 | Miles et al. ............... 279/62 |
| 6,017,039 A | * | 1/2000 | Gaddis et al. ............. 279/62 |
| 6,247,705 B1 | * | 6/2001 | Yang et al. ................ 279/62 |
| 6,390,481 B1 | * | 5/2002 | Nakamuro ................. 279/62 |
| 6,428,018 B1 | * | 8/2002 | Aultman et al. ............ 279/61 |
| 6,575,478 B2 | * | 6/2003 | Rohm et al. ............... 279/62 |
| 6,581,942 B2 | * | 6/2003 | Rohm ...................... 279/62 |
| 6,648,342 B2 | * | 11/2003 | Aultman et al. ............ 279/61 |
| 6,659,474 B2 | * | 12/2003 | Sakamaki et al. ........... 279/62 |
| 6,843,485 B2 | * | 1/2005 | Sakamaki et al. ........... 279/62 |
| 6,848,691 B2 | * | 2/2005 | Yang et al. ................ 279/62 |
| 2002/0180164 A1 | * | 12/2002 | Aultman et al. ............ 279/61 |
| 2003/0141676 A1 | * | 7/2003 | Sakamaki et al. ........... 279/62 |

(Continued)

FOREIGN PATENT DOCUMENTS

EP    0 195 503 A1    9/1986

(Continued)

*Primary Examiner*—Monica Carter
*Assistant Examiner*—Michael W. Talbot
(74) *Attorney, Agent, or Firm*—Sughrue Mion, PLLC

(57) ABSTRACT

To provide an excellent chuck assembly that is superior in assembling workability, may be produced in low cost and is superior in mass-production property, in which a rotary sleeve (2) provided on a body (1) is rotated, jaws (4) engaged with rotary nuts (3) are moved back and forth to be opened and closed by the rotation of the rotary nut (3) rotated together with the rotary sleeve (2) and a tool is clamped by the jaws (4), a ring member (8) is provided in the rotary nuts (3), a convex and concave engaging means is provided between the ring member (8) and the rotary sleeve (2), and the ring member (8 and the rotary sleeve 2 are retained and prevented from falling apart from each other by the convex and concave engaging means.

19 Claims, 6 Drawing Sheets

U.S. PATENT DOCUMENTS

2004/0021275 A1* 2/2004 Sakamaki et al. ............ 279/62
2005/0023776 A1* 2/2005 Yang et al. .................... 279/62

FOREIGN PATENT DOCUMENTS

| | | | |
|---|---|---|---|
| EP | 0 585 486 A1 | 3/1994 | |
| EP | 1 025 940 A1 | 8/2000 | |
| JP | 4-365504 A | 12/1992 | |
| JP | 7-148606 A | 6/1995 | |
| WO | WO 02/100583 A1 | 12/2002 | |

* cited by examiner

CHUCK ASSEMBLY

BACKGROUND OF THE INVENTION

1. Field of the Invention

The present invention relates to a chuck assembly for clamping a tool.

2. Description of the Related Art

As shown in FIG. 1, in a chuck assembly in accordance with, for example, Japanese Patent Application Laid-Open No. Hei 4-365504, a rotary sleeve 32 provided on a body 31 is rotated, jaws 34 engaged with rotary nuts 33 are moved back and forth to be opened and closed by the rotation of the rotary nuts 33 rotated together with the rotary sleeve 32 to thereby clamp the tool by the jaws 34, the rotary nuts 33 are formed into an annular shape with the divided nuts, and a shape holding ring 35 is provided around the rotary nuts 33 for holding an overall shape of the rotary nuts 33 composed of divided nuts attached to an inner circumferential surface of the rotary nuts 33. In this case, reference numeral 37 designates a grip sleeve.

By the way, if the shape holding ring 35 attached to the rotary sleeve 32 for holding the shape of the rotary nuts 33 is simply engaged with the rotary sleeve 32, there is a fear that the rotary sleeve 32 would fall apart therefrom. Accordingly, in the conventional chuck assembly, an annular groove is formed in the inner circumferential surface of the rotary sleeve 32, and a stop ring 36 is arranged for the annular groove to thereby prevent the rotary sleeve 32 from falling apart.

However, it is troublesome to arrange the stop ring 36. Also, it goes without saying that the cost for the assembly is increased corresponding the provision of the stop ring 36.

SUMMARY OF THE INVENTION

Accordingly, in order to overcome the above-noted defects, an object of the present invention is to provide an excellent chuck assembly that is superior in assembling workability, may be produced in low cost and is superior in mass-production property, in which a convex and concave engaging means is provided between a rotary sleeve and a ring member (shape holding ring), the ring member (shape holding ring) and the rotary sleeve are engaged with each other by the convex and concave engaging means so that the ring member (shape holding ring) may be retained to the rotary sleeve while being prevented from the rotary sleeve by a so-called one action.

A summary of the invention will now be described briefly with reference to the accompanying drawings.

According to the first aspect of the invention, there is provided a chuck assembly in which a rotary sleeve 2 provided on a body 1 is rotated, jaws 4 engaged with rotary nuts 3 are moved back and forth to be opened and closed by the rotation of the rotary nut 3 rotated together with the rotary sleeve 2 and a tool is clamped by the jaws 4, characterized in that a ring member 8 is provided in the rotary nuts 3, a convex and concave engaging means is provided between the ring member 8 and the rotary sleeve 2, and the ring member 8 and the rotary sleeve 2 are retained and prevented from falling apart from each other by the convex and concave engaging means.

Also, in the chuck assembly according to the first aspect, according to a second aspect of the invention, an annular assembly including divided nut elements is used as the rotary nuts 3 and the ring member 8 is used for holding a shape of the divided nuts.

Also, in the chuck assembly according to the first or second aspect, according to a third aspect of the invention, the convex and concave engaging means comprises a concave portion 9 provided in a circumferential surface of the rotary sleeve 2 and a lateral or convex projection 10 provided in the ring member 8 and fitted and retained with the concave portion 9.

Also, in the chuck assembly according to the third aspect, according to a fourth aspect of the invention., the concave portion 9 is either a groove or a window.

Also, in the chuck assembly according to the first or second aspect, according to a fifth aspect of the invention, the convex and concave engaging means comprises a U-shaped window in side elevation composed of a circumferential groove 9a provided in a circumferential surface of the rotary sleeve 2 made of synthetic resin and longitudinal grooves 9b contiguous with both ends of the circumferential groove 9a, and the projection 10 provided in the ring member 8 made of metal, fitted and retained with the circumferential groove 9a of the window, and extending in the circumferential direction of the ring member 8.

Also, in the chuck assembly according to the first or second aspect, according to a sixth aspect of the invention, the convex and concave engaging means provided in the rotary sleeve 2 is provided in a predetermined angular position or the same angular position as viewed from the backside of the rotary sleeve 2 with respect to a convex and concave engaging portion for rotating the rotary nuts 3 and the rotary sleeve 2 together.

Also, in the chuck assembly according to the third aspect, according to a seventh aspect of the invention, the convex and concave engaging means provided in the rotary sleeve 2 is provided in a predetermined angular position or the same angular position as viewed from the backside of the rotary sleeve 2 with respect to a convex and concave engaging portion for rotating the rotary nuts 3 and the rotary sleeve 2 together.

Also, in the chuck assembly according to the fourth aspect, according to an eighth aspect of the invention, the convex and concave engaging means provided in the rotary sleeve 2 is provided in a predetermined angular position or the same angular position as viewed from the backside of the rotary sleeve 2 with respect to a convex and concave engaging portion for rotating the rotary nuts 3 and the rotary sleeve 2 together.

Also, in the chuck assembly according to the fifth aspect, according to a ninth aspect of the invention, the convex and concave engaging means provided in the rotary sleeve 2 is provided in a predetermined angular position or the same angular position as viewed from the backside of the rotary sleeve 2 with respect to a convex and concave engaging portion for rotating the rotary nuts 3 and the rotary sleeve 2 together.

With the arrangement according to the invention, when the ring member 8 attached to the inner circumferential surface of the rotary sleeve 2 of the chuck assembly for clamping the tool is to be retained to the rotary sleeve 2 while being prevented from falling apart, it is unnecessary to provide the discrete stop ring 36 separated from the ring member 8 as in the conventional case but it is possible to retain the ring member 8 to the rotary sleeve 2 by one action while preventing the ring member 8 from falling apart from the rotary sleeve 2 by the convex and concave engaging means provided between the rotary sleeve 2 and the ring member 8.

Accordingly, according to the present invention, the manufacturing process is simplified, and furthermore, the assembling workability is enhanced to extremely simplify the manufacturing process. It is possible to provide a chuck assembly that is superior in mass-production property and cost performance.

DESCRIPTION OF THE PREFERRED EMBODIMENTS

Figure 1:
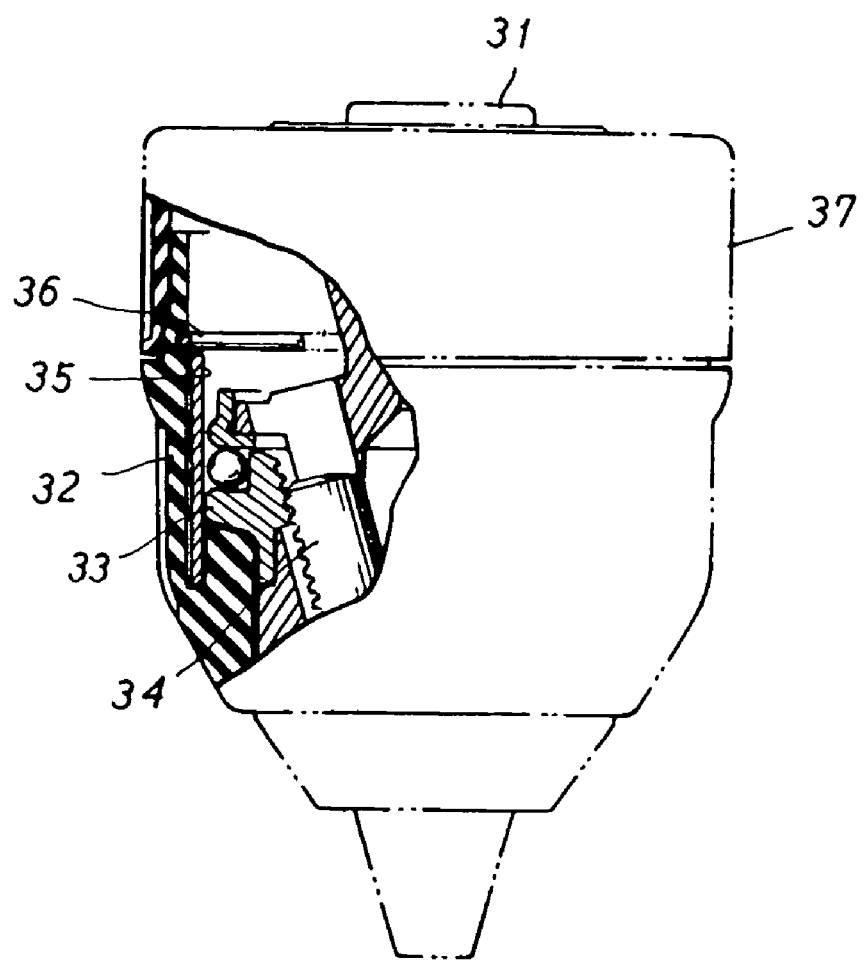
FIG. 1 is a partially fragmentary side elevational view of a conventional case.
Figure 2:
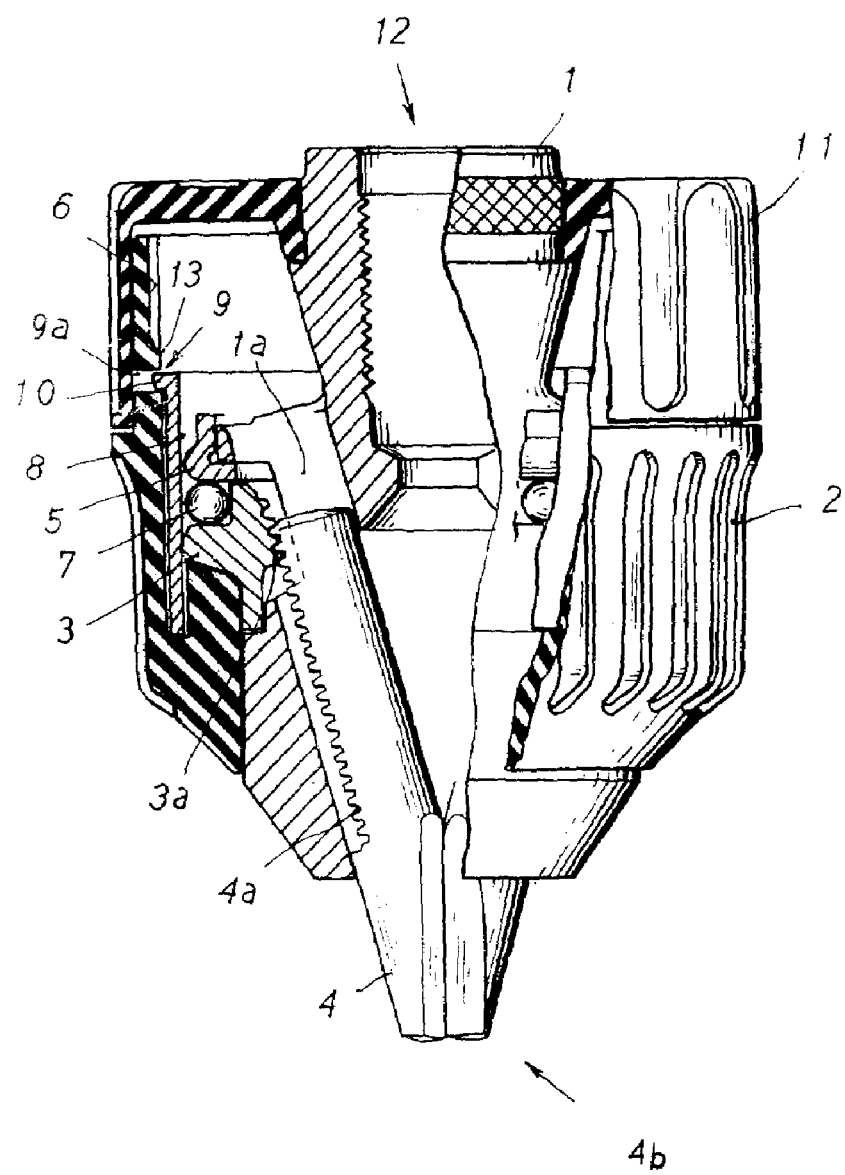
FIG. 2 is a partially fragmentary side elevational view of an assembly according to a first embodiment of the invention.
Figure 3:
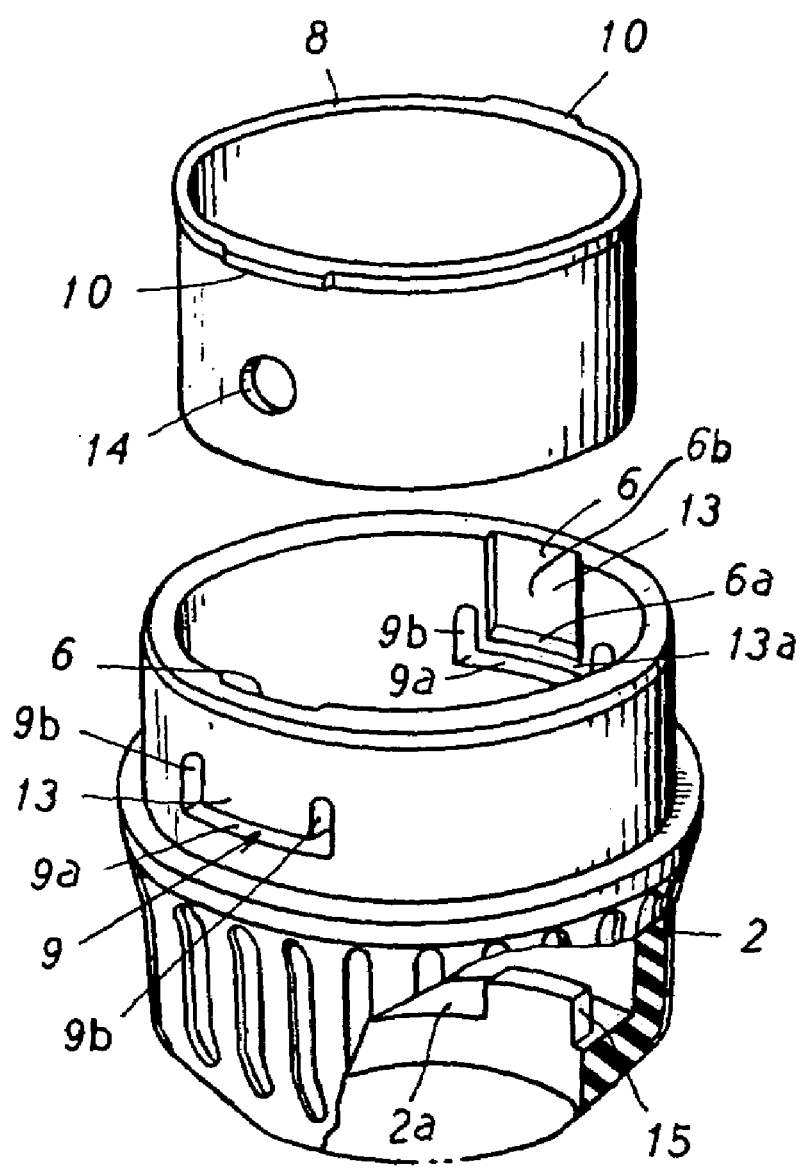
FIG. 3 is an exploded perspective view of the assembly according to the first embodiment of the invention.

A first embodiment of the present invention will now be described with reference to FIGS. 2, 3 and 4.

The first embodiment is directed to a chuck assembly in which a rotary sleeve 2 provided on a body 1 is rotated, jaws 4 engaged with rotary nuts 3 are moved back and forth to be opened and closed by the rotation of the rotary nuts 3 rotated together with the rotary sleeve 2 to thereby hold a tool by the jaws 4. A ring member 8 is provided on the rotary nuts 3. A convex and concave engaging means is provided between the ring member 8 and the rotary sleeve 2. The ring member 8 and the rotary sleeve 2 are retained and prevented from falling apart from each other by the convex and concave engaging means.

Describing the body 1 more specifically, there are provided the three jaws 4 forming a tool clamping portion in their inner circumferential surfaces, passing through slant hole 1a formed in the body 1 and projecting toward a tip end and slanted with respect to an axis of the body 1. Male screw portions 4a are formed on the outer surfaces of the three jaws 4. The jaws 4 having a tip end 4b. The rotary nuts 3 having the female screw portions 3a are fitted with the jaws 4 to be engaged with the male screw portions 4a.

Two divided semicircular nuts are adopted as the rotary nuts 3.

The rotary sleeve 2 made of synthetic resin is fitted around the body 1.

A convex and concave engaging portion (drive key) is provided between a tip end of the rotary nuts 3 and an inner stepped portion 2a of the rotary sleeve 2 for rotating the rotary nuts 3 and the rotary sleeve 2 together. The rotary nut 3 side of the convex and concave engaging portion is formed into a concave portion (not shown), whereas the rotary sleeve 2 side thereof is formed into a convex portion 15 so that the concave portion and the convex portion are coupled with each other to face each other. Incidentally, the convex portion 15 is formed to project from the inner edge of the inner stepped surface 2a of the rotary sleeve 2.

A pair of windows are formed in the same angular position in the rear view (viewed from above in FIG. 3) of the rotary sleeve 2 as the convex portion 15 in the circumferential surface of the rotary sleeve 2.

More specifically, each window is formed in U-shapes as viewed in side elevational view. Each U-shaped window as viewed in side elevation is formed by a circumferential groove 9a and longitudinal grooves 9b formed at both ends of the circumferential groove 9a.

A member made of metal and formed into a thin annular shape is adopted as the ring member 8. The ring member 8 is used to hold the divided nuts into a ring shape. A pair of side lateral projections 10 formed in the circumferential direction and engaged and retained with the circumferential grooves of the pair of windows formed in the rotary sleeve 2 are formed in an outer circumferential surface of a proximal end of the ring member 8.

Each concave groove 6 having a somewhat greater width than the width of the lateral or convex projection 10 is formed from the proximal end edge to the vicinity of the circumferential groove 9a in the inner circumferential surface of the rotary sleeve 2. Due to the existence of the concave groove 6, the projection 10 does not obstruct and the ring member 8 is enable to be engaged in the rotary sleeve 2. Incidentally, a lower surface 6a of the concave groove 6 in FIG. 3 is formed into a tapered surface that is formed wider toward the upper portion so that the projection 10 may ride over the concave groove 6 more easily.

Figure 4:
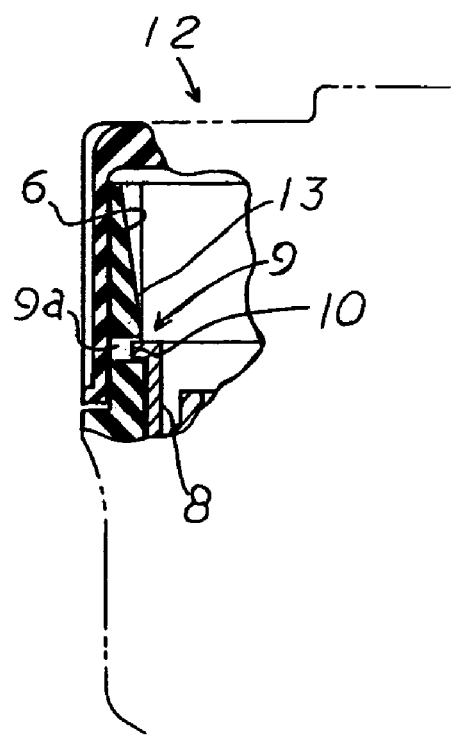
FIG. 4 is a side elevational, sectional view of a primary part of another example of the assembly according to the first embodiment of the invention.

FIG. 4 shows the case where the lower surface 6a is made small as much as possible and the inner surface 6b is tapered to be wider toward the upper portion.

In the case where the window is formed into a U-shape in side elevation, a movable plate 13 surrounded by the three grooves is formed, and this movable plate 13 becomes an elastic plate because the rotary sleeve 2 is made of synthetic resin. This movable plate 13 is pushed and moved to the outside by the projection 10 when the projection 10 passes through the movable plate 13. Accordingly, the projection 10 smoothly rides over the edge 13a of the movable plate 13 and smoothly moves to the circumferential groove 9a.

In the first embodiment, since the movable plate 13 is the elastic plate as described above, the rotary sleeve 2 is made of synthetic resin. However, the rotary sleeve 2 may be made of other material, for example, metal. However, in this case, it is necessary to provide such an elasticity that the elastic plate may restore to the original position after the elastic plate has been pushed by the projection 10.

Incidentally, in the first embodiment, as described above, the U-shaped window in side elevation is used. However, it is sufficient to provide the circumferential groove 9a only.

Also, in the first embodiment, rolling members 7 (steel balls, ceramic balls, plastic balls) are provided between the rotary nuts 3 and receiving portions 5 of the body 1. The rotary nuts 3 may be rotated smoothly by the rolling members 7.

Also, an insertion hole 14 through which the rolling members 7 may pass is formed in the circumferential surface of the ring member 8. More specifically, the rolling members 7 may be arranged through the insertion hole 14 under the condition that the rotary nuts 3 arranged in the body 1 may be held in shape by the ring member 8. The rolling members 7 are arranged from the insertion hole 14 just before a predetermined position where the annular ring 8 is arranged.

Also, in the first embodiment, since the window is formed in the same position as that of the convex portion 15 at the tip end of the rotary sleeve 2 (the portion where the convex and concave engaging portion engaging with the rotary nuts 3 is formed), more specifically, at the same angular position as viewed from the back side of the rotary sleeve 2 (as viewed from above in FIG. 3), the ring member 8 is fitted with the body 1 while the concave portions at the tip end of the rotary nuts 3 and the projections 10 of the ring member 8 are aligned with each other. Then, when the rotary sleeve 2 is fitted with the body 1 while the projections 10 and the concave grooves 6 are aligned with each other upon coupling the rotary sleeve 2 with the body 1 fitted with the ring member 8, the convex and concave engaging portion is partially engaged to be positioned. Under this alignment condition, the rotary sleeve 2 is pushed; that is, the rotary sleeve 2 is pushed until the ring member 8 is brought into contact with the inner stepped surface 2a of the rotary sleeve 2. The coupling work of the convex and concave engaging portion and the retaining work of the projections 10 with the circumferential grooves 9a may be simultaneously performed to thereby simplify the assembling work.

Reference numeral 11 denotes a grip sleeve provided while prevented from rotating around the body 1. Reference numeral 12 denotes a coupling portion to be coupled with a main shaft of an electric drill.

Describing the operation of the first embodiment, the tool is inserted into the three jaws 4 and the rotary nuts 3 are rotated to thereby advance and close the jaws 4 for clamping the tool so that, for example, boring work is performed by the tool.

With the arrangement of the first embodiment, when the ring member 8 attached to the inner circumferential surface of the rotary sleeve 2 of the chuck assembly for clamping the tool is to be retained while being prevented from falling apart, it is unnecessary to provide the discrete stop ring 36 separated from the ring member 8 as in the conventional case but it is possible to retain the ring member 8 to the rotary sleeve 2 by one action while preventing the ring member 8 from falling apart from the rotary sleeve 2 by the convex and concave engaging means provided between the rotary sleeve 2 and the ring member 8.

More specifically, due to the existence of the concave grooves 6, the projections 10 of the ring member 8 may be smoothly moved to the movable plates 13 formed by the U-shaped windows as viewed in side elevation, and furthermore, the movable plates 13 are pushed and moved to the outside by the projections 10 so that the projections 10 are not prevented from moving to the circumferential grooves 9a. Namely, it is unnecessary to take such care that the ring groove is formed in the circumferential surface of the rotary sleeve 2 and the stop ring 36 is provided and the engagement and retention between the windows formed in the inner circumferential surface of the rotary sleeve 2 and the projections 10 formed in the ring member 8 is simply performed so that the ring member 8 may be retained to the rotary sleeve 2 while preventing the ring member 8 from falling apart. Accordingly, it is possible to attach the ring member 8 to the inner circumferential surface of the rotary sleeve 2 by one action, which is extremely superior in workability.

It is therefore possible to reduce the number of the parts and the number of the steps of manufacture, to facilitate the manufacturing steps and to simplify the manufacturing process much more simply and more effectively.

Accordingly, in accordance with the first embodiment, since the ring member 8 may be retained to the rotary sleeve 2 and prevented from falling apart therefrom by one action, the assembly is extremely superior in mass-production aspect and may be produced much more effectively through the less manufacturing work.

As described above, in the first embodiment, the manufacturing process is simplified, and furthermore, the assembling workability is enhanced to extremely simplify the manufacturing process. This is superior in mass-production property and cost performance.

Figure 5:
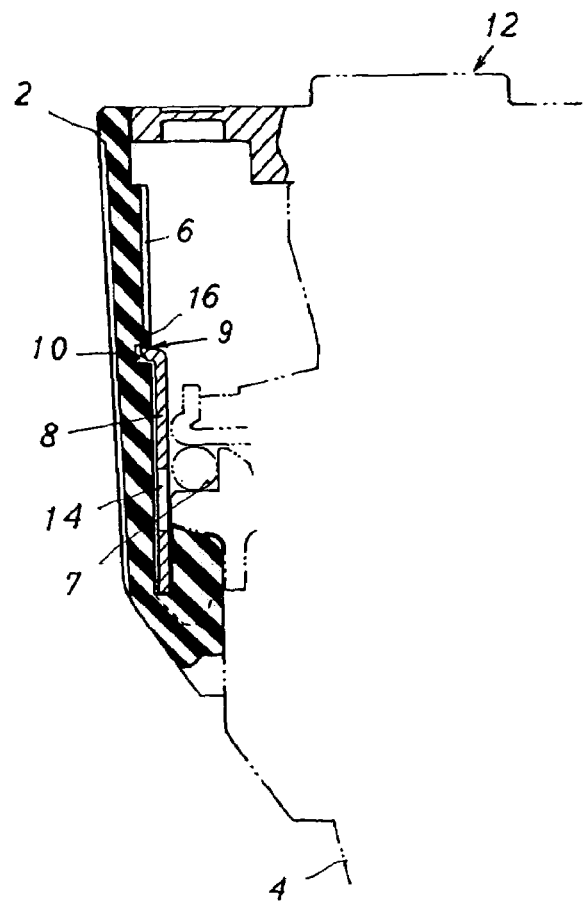
FIG. 5 is a partially fragmentary side elevational view of an assembly according to a second embodiment of the invention.
Figure 6:
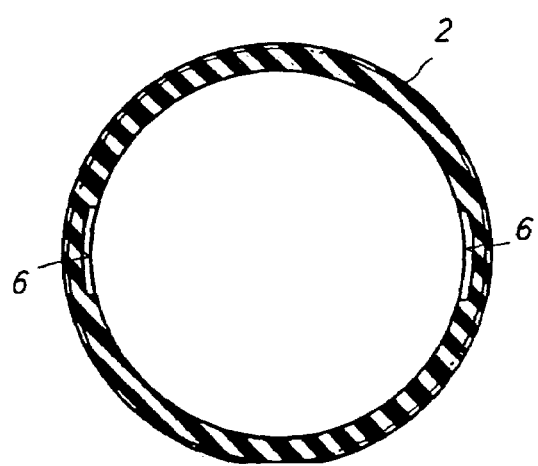
FIG. 6 is an illustrative plan view of the assembly according to the second embodiment.
Figure 7:
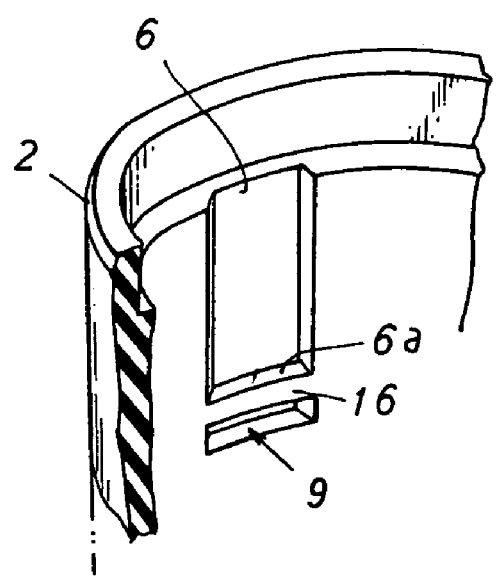
FIG. 7 is an illustrative partial perspective view of the assembly according to the second embodiment.

FIGS. 5, 6 and 7 show a second embodiment in which in the foregoing first embodiment, the above-described rotary sleeve 2 is extended backwardly to dispense with the above-described grip sleeve 11. The second embodiment will now be described. The assembly according to the second embodiment is used in the case of the electric tool where the spindle is locked. Incidentally, the same components as those in the first embodiment are designated by the same reference numerals as those of the first embodiment.

The second embodiment is directed to a chuck assembly in which a rotary sleeve 2 provided on a body 1 is rotated, jaws 4 engaged with rotary nuts 3 are moved back and forth to be opened and closed by the rotation of the rotary nuts 3 rotated together with the rotary sleeve 2 to thereby hold a tool by the jaws 4. A ring member 8 is provided on the rotary nuts 3. A convex and concave engaging means is provided between the ring member 8 and the rotary sleeve 2. The ring member 8 and the rotary sleeve 2 are retained and prevented from falling apart from each other by the convex and concave engaging means.

Describing the body 1 more specifically, there are provided the three jaws 4 forming a tool clamping portion in their inner circumferential surfaces, passing through slant hole 1a formed in the body 1 and projecting toward a tip end and slanted with respect to an axis of the body 1. Male screw portions 4a are formed on the outer surfaces of the three jaws 4. The rotary nuts 3 having the female screw portions 3a are fitted with the jaws 4 to be engaged with the male screw portions 4a.

Two divided semicircular nuts are adopted as the rotary nuts 3.

The rotary sleeve 2 made of synthetic resin is fitted around the body 1.

A convex and concave engaging portion (drive key) is provided between a tip end of the rotary nuts 3 and an inner stepped portion 2a of the rotary sleeve 2 for rotating the rotary nuts 3 and the rotary sleeve 2 together. The rotary nut 3 side of the convex and concave engaging portion is formed into a concave portion (not shown), whereas the rotary sleeve 2 side thereof is formed into a convex portion 15 so that the concave portion and the convex portion are coupled with each other to face each other. Incidentally, the convex portion 15 is formed to project from the inner edge of the inner stepped surface 2a of the rotary sleeve 2.

A pair of grooves 9 are formed in the same angular position in the rear view (viewed from above in FIG. 3) of the rotary sleeve 2 as the convex portion 15 in the circumferential surface of the rotary sleeve 2.

A member made of metal and formed into a thin annular shape is adopted as the ring member 8. The ring member 8 is used to hold the divided nuts into a ring shape. A pair of side lateral or convex projections 10 formed in the circumferential direction and engaged and retained with the pair of grooves formed in the rotary sleeve 2 are formed in an outer circumferential surface of a proximal end of the ring member 8.

Each concave groove 6 having a somewhat greater width than the width of the projection 10 is formed from the proximal end edge to the vicinity of the circumferential groove 9a in the inner circumferential surface of the rotary sleeve 2. Due to the concave grooves 6, the projection 10 does not obstruct and the ring member 8 is enable to be engaged in the rotary sleeve 2.

Also, a lower surface 6a of the concave groove 6 in FIG. 7 is formed into a tapered surface that is formed wider toward the upper portion so that the projection 10 may ride over the concave groove 6 more easily. Accordingly, the linear projection 10 rides over a ride-over portion 16 to the groove 9.

Incidentally, also in the second embodiment, the lower surface 6a may be structured as shown in FIG. 4.

Also, in the second embodiment, rolling members 7 (steel balls, ceramic balls, plastic balls) are provided between the rotary nuts 3 and receiving portions 5 of the body 1. The rotary nuts 3 may be rotated smoothly by the rolling members 7.

Also, an insertion hole 14 through which the rolling members 7 may pass is formed in the circumferential surface of the ring member 8. More specifically, the rolling members 7 may be arranged through the insertion hole 14 under the condition that the rotary nuts 3 arranged in the body 1 may be held in shape by the ring member 8. The rolling members 7 are arranged from the insertion hole 14 just before a predetermined position where the annular ring 8 is arranged.

Also, in the second embodiment, since the groove 9 is formed in the same position as that of the convex portion 15 at the tip end of the rotary sleeve 2 (the portion where the convex and concave engaging portion engaging with the rotary nuts 3 is formed), more specifically, at the same angular position as viewed from the back side of the rotary sleeve 2 (as viewed from above in FIG. 3), the ring member 8 is fitted with the body 1 while the concave portions at the tip end of the rotary nuts 3 and the projections 10 of the ring member 8 are aligned with each other. Then, when the rotary sleeve 2 is fitted with the body 1 while the projections 10 and the concave grooves 6 are aligned with each other upon coupling the rotary sleeve 2 with the body 1 fitted with the ring member 8, the convex and concave engaging portion is partially engaged to be positioned. Under this alignment condition, the rotary sleeve 2 is pushed; that is, the rotary sleeve 2 is pushed until the ring member 8 is brought into contact with the inner stepped surface 2a of the rotary sleeve 2. The coupling work of the convex and concave engaging portion and the retaining work of the projections 10 with the groove 9 may be simultaneously performed to thereby simplify the assembling work.

Reference numeral 12 denotes a coupling portion to be coupled with a main shaft of an electric drill.

Describing the operation of the second embodiment, the tool is inserted into the three jaws 4 and the rotary nuts 3 are rotated to thereby advance and close the jaws 4 for clamping the tool so that, for example, boring work is performed by the tool.

With the arrangement of the second embodiment, when the ring member 8 attached to the inner circumferential surface of the rotary sleeve 2 of the chuck assembly for clamping the tool is to be retained while being prevented from falling apart, it is unnecessary to provide the discrete stop ring 36 separated from the ring member 8 as in the conventional case but it is possible to retain the ring member 8 to the rotary sleeve 2 by one action while preventing the ring member 8 from falling apart from the rotary sleeve 2 by the convex and concave engaging means provided between the rotary sleeve 2 and the ring member 8.

More specifically, due to the existence of the concave grooves 6, the projections 10 of the ring member 8 may be smoothly moved to the ride-over portions 16 just before the grooves 9, and furthermore, the projections 10 may ride over the ride-over portions 16 to the grooves 9. Namely, it is unnecessary to take such care that the ring groove is formed in the circumferential surface of the rotary sleeve 2 and the stop ring 36 is provided and the engagement and retention between the grooves 9 formed in the inner circumferential surface of the rotary sleeve 2 and the projections 10 formed in the ring member 8 is simply performed so that the ring member 8 may be retained to the rotary sleeve 2 while preventing the ring member 8 from falling apart. Accordingly, it is possible to attach the ring member 8 to the inner circumferential surface of the rotary sleeve 2 by one action, which is extremely superior in workability.

It is therefore possible to reduce the number of the parts and the number of the steps of manufacture, to facilitate the manufacturing steps and to simplify the manufacturing process much more simply and more effectively.

Accordingly, in accordance with the second embodiment, since the ring member 8 may be retained to the rotary sleeve 2 and prevented from falling apart therefrom by one action, the assembly is extremely superior in mass-production aspect and may be produced much more effectively through the less manufacturing work.

As described above, in the second embodiment, the manufacturing process is simplified, and furthermore, the assembling workability is enhanced to extremely simplify the manufacturing process. This is superior in mass-production property and cost performance.

What is claimed is:

1. A chuck assembly comprising:
   a body;
   a rotary sleeve provided on the body, the rotary sleeve being rotatable;
   a rotary nut;
   a jaw which is engaged with the rotary nut, the jaw being movable back and forth to be opened and closed by rotation of the rotary nut rotated together with the rotary sleeve;
   a ring member disposed to surround the rotary nut;
   a convex engaging means and a concave engaging means provided between the ring member and the rotary sleeve, such that the ring member and the rotary sleeve are retained and prevented from falling apart from each other by the convex and concave engaging means; and
   a slotted portion which guides the convex engaging means toward the concave engaging means, such that upon reaching the concave engaging means, the convex engaging means extends into the concave engaging means so as to be held in place,
   wherein the slotted portion is positioned above the concave engaging means in a state where a tip end of the jaw points downwardly.

2. The chuck assembly according to claim 1, wherein an annular assembly including divided nut elements is used as the rotary nut and the ring member is used for holding a shape of the divided nut elements.

3. The chuck assembly according to claim 1 or 2, wherein said convex and concave engaging means comprises a concave portion provided in a circumferential surface of the rotary sleeve and a projection provided in the ring member and fitted and retained with the concave portion.

4. The chuck assembly according to claim 3, wherein the concave portion comprises at least one of a groove and a window.

5. The chuck assembly according to claim 1 or 2, wherein said convex and concave engaging means comprises a U-shaped window composed of a circumferential groove provided in a circumferential surface of the rotary sleeve made of synthetic resin and longitudinal grooves contiguous with both ends of the circumferential groove, and a projection provided in the ring member made of metal, fitted and retained with the circumferential groove of the window, and extending in the circumferential direction of the ring member.

6. The chuck assembly according to claim 2, wherein the convex and concave engaging means is provided in a predetermined angular position with respect to a convex and concave engaging portion for rotating the rotary nut and the rotary sleeve together.

7. The chuck assembly according to claim 3, wherein the convex and concave engaging means is provided in a predetermined angular position with respect to a convex and concave engaging portion for rotating the rotary nut and the rotary sleeve together.

8. The chuck assembly according to claim 4, wherein the convex and concave engaging means is provided in a predetermined angular position with respect to a convex and concave engaging portion for rotating the rotary nut and the rotary sleeve together.

9. The chuck assembly according to claim 5, wherein the convex and concave engaging means is provided in a predetermined angular position with respect to a convex and concave engaging portion for rotating the rotary nut and the rotary sleeve together.

10. The chuck assembly according to claim 1, wherein the convex engaging means includes tabs which are formed on a rim of the rotary sleeve.

11. The chuck assembly according to claim 1, wherein the slotted portion comprises a moveable plate which is deformed by the convex engaging means upon the convex engaging means passing by the moveable plate.

12. The chuck assembly according to claim 1, wherein the concave engaging means extends through a wall of the rotary sleeve.

13. The chuck assembly according to claim 1, wherein the slotted portion includes a tapered surface.

14. The chuck assembly according to claim 1, wherein the concave engaging means is U-shaped.

15. A chuck assembly comprising:
a body;
a rotary sleeve provided on the body, the rotary sleeve being rotatable;
a rotary nut;
a jaw which is engaged with the rotary nut, the jaw being movable back and forth to be opened and closed by rotation of the rotary nut rotated together with the rotary sleeve;
a ring member disposed to surround the rotary nut; and
a convex engaging means and a concave engaging means provided between the ring member and the rotary sleeve, such that the ring member and the rotary sleeve are retained and prevented from falling apart from each other by the convex and concave engaging means,
wherein said convex and concave engaging means comprises a U-shaped window composed of a circumferential groove provided in a circumferential surface of the rotary sleeve made of synthetic resin and longitudinal grooves contiguous with both ends of the circumferential groove, and a projection provided in the ring member made of metal, fitted and retained with the circumferential groove of the window, and extending in the circumferential direction of the ring member.

16. The chuck assembly according to claim 15,
wherein the convex and concave engaging means is provided in a predetermined angular position with respect to a convex and concave engaging portion for rotating the rotary nut and the rotary sleeve together.

17. The chuck assembly according to claim 1, wherein the slotted portion is disposed in the rotary sleeve.

18. The chuck assembly according to claim 1, wherein the convex and concave engaging means is provided in a predetermined angular position with respect to a convex and concave engaging portion for rotating the rotary nut and the rotary sleeve together.

19. A chuck assembly comprising:
a body;
a rotary sleeve provided on the body, the rotary sleeve being rotatable;
a rotary nut;
a jaw which is engaged with the rotary nut, the jaw being movable back and forth to be opened and closed by rotation of the rotary nut rotated together with the rotary sleeve;
a ring member disposed to surround the rotary nut;
a convex engaging means and a concave engaging means provided between the ring member and the rotary sleeve, such that the ring member and the rotary sleeve are retained and prevented from falling apart from each other by the convex and concave engaging means; and
a slotted portion which guides the convex engaging means toward the concave engaging means, such that upon reaching the concave engaging means, the convex engaging means extends into the concave engaging means so as to be held in place, wherein the slotted portion does not extend into the concave engaging means.

* * * * *